R. F. RASMUSSEN.
ANIMAL STALL.
APPLICATION FILED JUNE 19, 1916.
1,255,931. Patented Feb. 12, 1918.
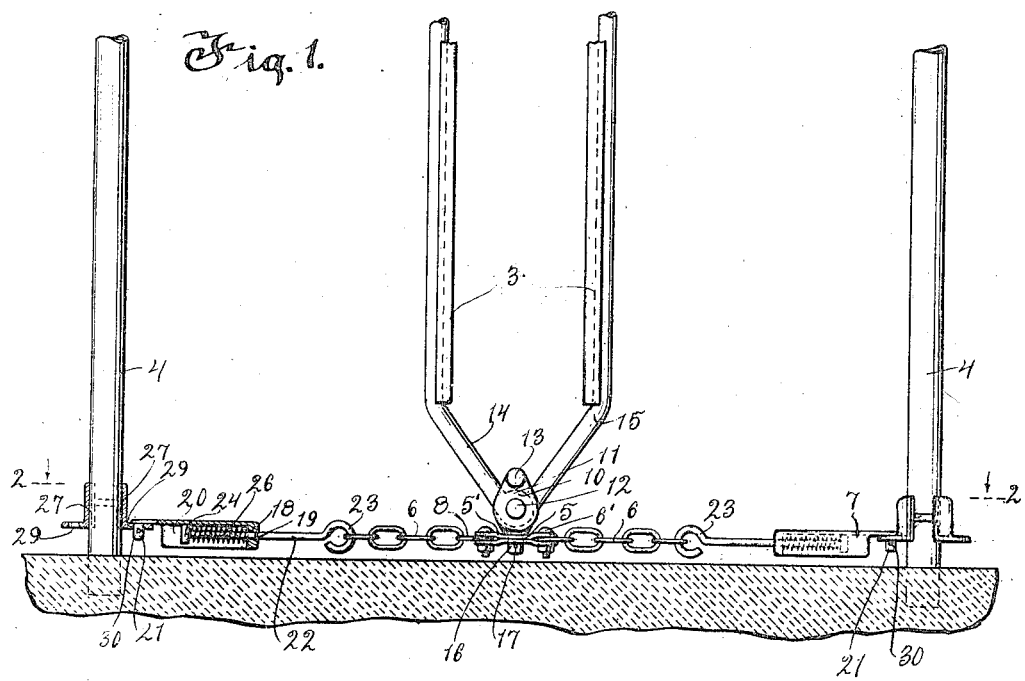
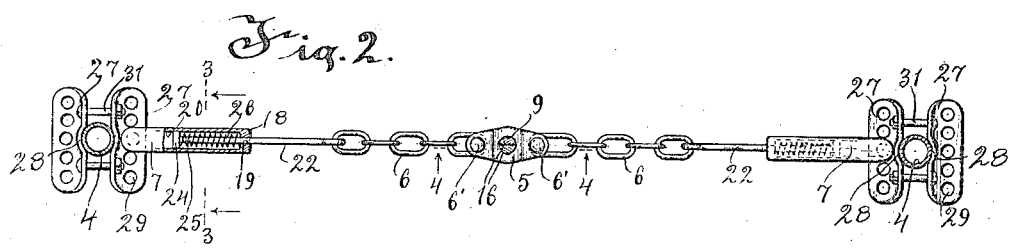
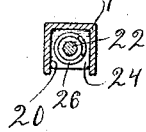
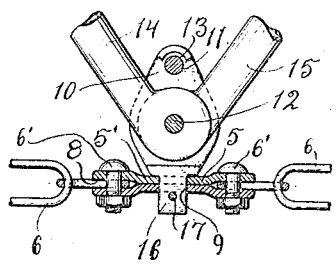
INVENTOR
Robert F. Rasmussen
Worrell, Keeney & French
ATTORNEYS

UNITED STATES PATENT OFFICE.

ROBERT F. RASMUSSEN, OF OSHKOSH, WISCONSIN, ASSIGNOR TO C. A. LIBBY COMPANY, OF OSHKOSH, WISCONSIN, A CORPORATION OF WISCONSIN.

ANIMAL-STALL.

1,255,931. Specification of Letters Patent. Patented Feb. 12, 1918.

Application filed June 19, 1916. Serial No. 104,381.

*To all whom it may concern:*

Be it known that I, ROBERT F. RASMUSSEN, a citizen of the United States, and resident of Oshkosh, in the county of Winnebago and State of Wisconsin, have invented new and useful Improvements in Animal-Stalls, of which the following is a description, reference being had to the accompanying drawings, which are a part of this specification.

The invention relates to animal stalls.

At the present time manufacturers of barn equipments are all striving to produce devices tending to increase the sanitary conditions of the barn and it is the present practice in cattle barns to make the stall floors of concrete with a gutter at the rear of the stalls. To make this gutter available for sanitary purposes, it is necessary to provide some means for positioning the animal in the stall so that its rear will come substantially at the edge of the gutter and to do this the means for positioning the animal must be made adjustable to accommodate for animals of different length.

It is one of the objects of this invention to provide a means for securing the lower part of the stanchion to the stall frame.

It is a further object of this invention to provide a stanchion anchor which embodies a yielding connection between it and the stall frame so that it will give when an animal which has been lying down starts to get up and naturally lurches forward in doing so and thus prevents any injury to the animal through a too tight stanchion anchor.

A further object of the invention is to provide a stanchion anchor which will allow some movement of the stanchion backwardly and forwardly and from side to side so as to give the animal plenty of freedom and stall comfort.

The invention consists in the several features hereinafter set forth and more particularly defined by claims at the conclusion hereof.

In the drawings:

Figure 1 is a side view of the device embodying the invention, parts being broken away and parts being shown in section;

Fig. 2 is a section taken on line 2—2 of Fig. 1;

Fig. 3 is a detail of the lower stanchion bracket;

Fig. 4 is a section taken on line 4—4 of Fig. 2.

The stanchion anchor or connecting means for the lower portion of the stanchion 3 with the stall uprights 4 comprises a central connecting member 5, chains 6 connected at one of their ends to said member 5, hooked bracket members 7 and a yielding connection between each bracket 7 and the other ends of the chains 6, and means for adjustably securing the ends of the device to the uprights 4.

The member 5 is formed of two plates 5' secured together to form forked ends 8 for receiving the ends of the chains 6 and provided with a central aperture 9. The inner ends of the chains 6 fit within the bifurcations of the ends 8 and are detachably secured thereto by bolts 6'. In the present instance, I make a direct connection between the stanchion and its anchor by providing a new and improved form of lower end stanchion bracket 10. The bracket 10 is formed of two similar parts 11 secured together by bolts 12 and 13, the bolt 12 serving as a pivot bolt for the side members 14 and 15 of the stanchion 3. Each member 11 is provided with a downwardly extending semi-cylindrical lug 16 and when the two parts are joined the pin formed thereby is adapted to be inserted through the aperture 9 in the member 5 and is pivotally secured therein and thereto by a cotter pin 17 passing through the ends of the lugs 16. Thus the lower end of the stanchion is directly pivotally secured or swiveled to the member 5.

The hooked brackets 7 are provided with solid ends 18 having apertures 19 therein and with channeled portions 20 and hooks including depending pins 21, said pins 21 preferably extending at right angles to the bracket to provide for a direct pull on the chains 6.

The yielding connection between the chains 6 and the brackets 7 comprises, in each instance, a rod 22 having a hooked end 23 for receiving one of the links of the corresponding chain 6, said rod being slidably mounted in the aperture 19 and in the channeled portion 20 of the bracket 7 and carrying a nut 24 on its threaded end 25 which nut slidably engages the sides of the channel and thereby prevents rotation of the rod 22 with respect to the bracket 7 and also provides for the adjusting of the spring 26 which surrounds the rod 22 and is disposed in said channel 20 between the head or end 18 and said nut. Though I have shown the hooks 23 of the rods 22 in engagement with the last links of the chains 6, said hooks may be brought into engagement with other of the chain links to vary the length of the connection so as to permit the device to be used in connection with stalls of different widths.

The means for adjustably securing the ends of the device to the uprights 4 comprises clips 27 mounted on said posts or uprights. Each clip comprises an angled plate, the side of which is centrally curved, as at 28, to rest against the post and the lower flange portion of which is provided with a series of apertures 29 for receiving the pin 21 in any one of them, said pin being secured therein against removal by a cotter pin 30. Each pin is secured to the post by bolts 31 which clamp two oppositely disposed clips to the post. The adjustable connection between the brackets 7 and the clips 27 provide for moving the lower end of the stanchion either forwardly or backwardly with respect to the stall to thereby adjust the position of the animal with respect to the gutter.

With the construction above described, through the pivoted and yielding connection, a limited movement of the stanchion back and forth and sidewise with respect to the stall frame is provided to increase the animal's comfort and prevent injury to it.

What I claim as my invention is:

1. The combination, with stall standards and a stanchion, of chains secured on both sides of the lower end of the stanchion, hooked brackets, clips secured to said stall uprights and having a plurality of spaced apart apertures therein for adjustably receiving the hooked portion of said brackets, rods slidably mounted in said brackets and secured to said chains, and a yielding connection between said rods and brackets.

2. The combination with stall standards and a stanchion, of clips having a plurality of spaced apart apertures therein secured to said standards, brackets having lugs extending at substantially right angles thereto adapted to be inserted in any of said apertures to permit horizontal swinging movement of the brackets with respect to the standards, and an adjustable yielding connection between said brackets and both sides of the lower end of the stanchion.

In testimony whereof, I affix my signature.

ROBERT F. RASMUSSEN.

Copies of this patent may be obtained for five cents each, by addressing the "Commissioner of Patents, Washington, D. C."